(12) United States Patent
Jorgensen

(10) Patent No.: US 6,536,331 B2
(45) Date of Patent: *Mar. 25, 2003

(54) DEVICE AND METHOD FOR PREPARING HOT BEVERAGES

(75) Inventor: Carsten Jorgensen, Niklausen (CH)

(73) Assignee: PI-Design AG, Triengen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/771,685

(22) Filed: Jan. 30, 2001

(65) Prior Publication Data

US 2001/0018867 A1 Sep. 6, 2001

Related U.S. Application Data

(63) Continuation-in-part of application No. 09/412,641, filed on Oct. 5, 1999, now Pat. No. 6,178,874.

(30) Foreign Application Priority Data

Nov. 25, 1998 (EP) ............................................. 98122329

(51) Int. Cl.[7] ............................................. A47J 31/047
(52) U.S. Cl. ............................................. 99/292; 99/303
(58) Field of Search .......................... 99/292, 303, 308, 99/309, 310, 313

(56) References Cited

U.S. PATENT DOCUMENTS

| | | | |
|---|---|---|---|
| 2,223,450 A | 12/1940 | Jepson et al. ................. | 219/43 |
| 2,287,571 A | 6/1942 | Purpura ....................... | 219/43 |
| 2,345,264 A | * 3/1944 | Jepson ........................ | 99/292 |
| 2,576,432 A | * 11/1951 | Wilcox ........................ | 99/292 X |
| 5,699,718 A | * 12/1997 | Yung et al. ................... | 99/292 |

FOREIGN PATENT DOCUMENTS

| | | |
|---|---|---|
| EP | 0292649 | 11/1988 |
| EP | 0841030 | 5/1998 |

* cited by examiner

*Primary Examiner*—Reginald L. Alexander
(74) *Attorney, Agent, or Firm*—Gary M. Nath; Harold L. Novick; Marvin C. Berkowitz

(57) ABSTRACT

A device for preparing beverages of the type having a closed compartment, an open compartment, an ascension pipe connecting the two compartments and a location for a filtering device between the ascension pipe and the open compartment. The closed compartment has a bottom that has at least a first and a second area which are at different levels and has a member for separating the two areas. The first area is larger than the second area, is heated, and is at a higher level than the second level and than the end of the ascension pipe. The second, smaller area is unheated and is located near the ascension pipe, but at a level that is below the end of the ascension pipe. In one embodiment the separating member is a rim and in a second embodiment the separating member is an inclined bottom.

14 Claims, 5 Drawing Sheets

DEVICE AND METHOD FOR PREPARING HOT BEVERAGES

This application is a continuation in-part application of U.S. patent application Ser. No. 09/412,641, filed Oct. 5, 1999, now U.S. Pat. No. 6,178,874, the entire contents of the application and patent of which are hereby incorporated in their entirety.

FIELD OF INVENTION

The present invention relates to a device for preparing beverages of the type having a closed compartment, an open compartment, an ascension pipe connecting the compartments and a filtering device between the ascension pipe and the open compartment. Further, the invention relates to a method for preparing beverages using the above mentioned device, where liquid is brought to the desired infusion temperature in the closed compartment and is forced by the steam pressure through the ascension pipe and the filtering device to the open compartment containing the aromatic carriers, after which the steam from the remainder of the liquid in the closed compartment condenses in the liquid in the open compartment thereby heating the mixture of liquid and the aromatic carriers to the desired infusion temperature for some time, after which the closed compartment is allowed to cool thereby decreasing the pressure in the closed compartment so as to bring back the beverage by suction of the beverage through the filter and the ascension pipe to the closed compartment leaving the residuals of the aromatic carriers in the open compartment.

BACKGROUND OF THE INVENTION

Such device and method is known from e.g. DK 90776 and 98310 and was developed for about forty years ago. Common to those prior devices is, that for heating the contents of the device an external heating source is needed. Such heating source can be achieved using a spirit lamp or a hotplate, but for some applications such external heating sources might be, inappropriate. The use of open fire might increase the. risk for fire and other external heating sources with their up-turned hot surfaces might also increase the risk for burning the operating persons or simply melting plastics items unintendedly left on such hot surfaces. Further, the infusion time is either fixed being decided by the distance between the lower orifice of the ascending pipe and the bottom of the closed compartment or left to the user to estimate.

It is commonly known to use liquid heating vessels energized by electricity, and such liquid heating vessel is disclosed in EP 0841030 A1. The novel aspect there is, that a heating element is fixed with a sealing flange to the underside of a metal plate which closes the bottom of the vessel. Such heating vessels are because of the sealing means inappropriate for preparing beverages as disclosed in the ingress of the specification, and the inventor has consequently as a goal to solve the disadvantages of the state of the art, thereby minimizing the risks of the prior art.

SUMMARY OF THE INVENTION

To this end the inventor has suggested a device as mentioned in the ingress of the specification, where the bottom of the closed compartment is comprising at least two levels, one level of diminished elevation in a relatively small area around the lower orifice of the ascension pipe, the level of which is at least below the other elevated level of a relatively large area, said large area being equipped with electrical heating means controlled by switching means and at least one temperature sensitive means for controlling the switching means, said large area of the bottom being surrounded by a rim for holding a residual of liquid.

With the device according to the invention the inventor has eliminated the above mentioned risks of fire and burning and further, some more advantages like the possibility to control the infusion time have been achieved in the multi-level bottom and the electrical operation of the device.

From EP-O 292649 A1 it is known to have the bottom of the closed compartment split in two sections, an upper and a lower section, where each section has a heating element. This device is aimed at making tea by varying the distance above the lower bottom of the ascension pipe's orifice in order to adjust the infusion time for the tea during which the water at the lower level evaporates. This prior art, however, is not suited for making e.g. coffee and it is costly to produce, as it contains a relatively large number of parts, particularly the moveable ascension pipe. Further, the ascension pipe must be of a type which is sealingly moveable in order to control the flow of the water/tea. Also, the lower level is equipped with a heating element which means that only boiling water will ascend through the ascension pipe. Thereby the temperature of the water in the upper/open compartment will inevitably never approximate the boiling temperature of the water and the infusion will not meet the goal of performing the infusion at the optimum temperature of the aromatic carriers.

In an embodiment of the invention it is suggested that the heating means comprise at least two different heating means, for differentiated heating supply to the closed compartment. If, further, a temperature sensitive means is functionally connected to a switching means for each heating means, it is possible within narrow limits to keep the beverage at a preferred temperature for drinking, as such temperature control is more adequately achieved by electrical operation than by e.g. a spirit lamp or a hotplate. It should here be understood, that the switching means are mechanically operated, but the switching means can as well be electronically operated. To this end, it is most appropriate having the electronically switching means controlled by at least one micro processor, which is not shown in detail in the drawings.

In another embodiment of the invention it is suggested that the device for preparing beverages comprise means for varying the infusion time, where the variation of the infusion time is controlled electronically by the micro processor through delayed switching on of at least one of the heating means during the cooling-off of the closed compartment.

In still another embodiment a variation of the infusion time is achieved by varying the effective height of the rim, so as to vary the contents of the residual liquid to be evaporated. To this end it is suggested, that a cylindrical lining on the inside of the rim is pivotally and sealingly secured to the rim being of varying height along the circumference, said lining itself being of varying height. Of course, the rim could as well be a lining in a pivotable regulation cylinder, but it seem to be most practical to use the pivotable lining.

The invention further relates a method for preparing beverages using the device according to the invention, the method being of the type as mentioned in the ingress of the specification, where the inventor suggests the following steps:

i. using the heating means of the relatively large area for:
 a. heating the liquid in the closed compartment, thereby increasing the pressure in said closed compartment and forcing the liquid to the open compartment and leaving a residual of liquid behind the rim surrounding the relatively large area equipped with the heating means, b. evaporating the residual of liquid behind said rim, thereby maintaining the pressure in the closed compartment by exhausting the steam through the ascension pipe to the open compartment, where the steam condenses in the mixture of liquid and aromatic carriers, heating the mixture to a desired infusion temperature, which is maintained until the evaporation is finished, the duration of which is decided by the volume of the residual of liquid, or the effective height of the rim enclosing the volume of liquid, c. heating the relatively large area of the closed compartment, thereby increasing the temperature until the temperature sensitive means react and switch the circuit supplying the heating means, and ii. by switching off the circuit supplying the heating means of the relatively large area leaving the closed compartment, a. to cool, decreasing the pressure in the closed compartment to a vacuum or depression;

b. to use the vacuum to perform a suction of the beverage from the open compartment through the filter and the ascension pipe into the closed compartment, and c. to leave the carriers of the aroma in the open compartment;

iii. switching the heating means to a power state being sufficient to keep the beverage at the desired temperature.

By initiating the final switching iii at a delayed time, the returning of the beverage can be advanced so as to shorten the infusion time. This aspect might serve to allow the user to choose a different taste of the beverage.

BRIEF DESCRIPTION OF THE DRAWINGS

Preferred embodiments and methods according to the present invention are disclosed hereinafter by way of non-limiting example with reference to the accompanying drawings in which.

DETAILED DESCRIPTION OF THE PRESENTLY PREFERRED EMBODIMENTS

Figure 1A:
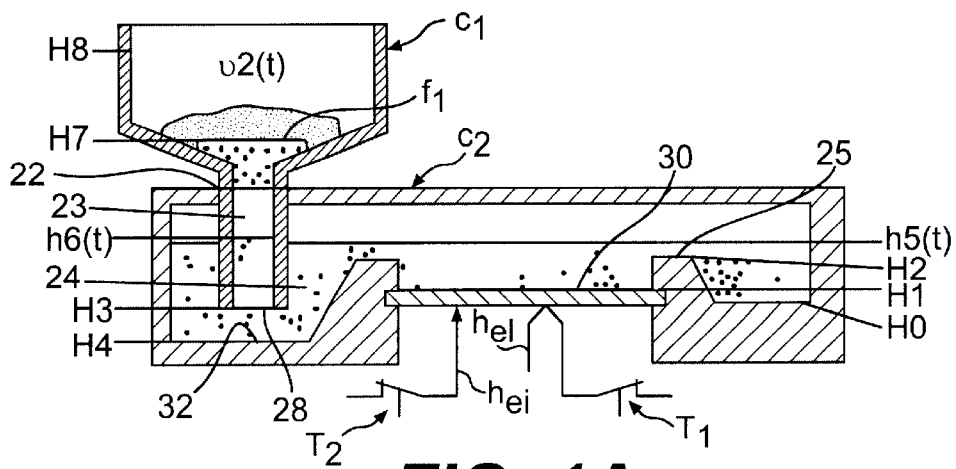
FIG. 1 is a schematic drawing of the hot beverage device according to the invention, where the different numbers refer to different stages of the infusion process.

A device according to a first embodiment of the present invention is depicted in greatest detail in FIG. 1A. The device is comprised of an open compartment c1 removably mountable on a closed compartment c2 through an inlet 22 in closed compartment c2. A hollow ascension pipe 23 having an inner bore and a bottom opening 28 is mounted in inlet 22 and extends a predetermined distance downwardly inside closed compartment c2. A body of a liquid, such as water at ambient temperature and pressure, has been previously added to closed compartment c2 through inlet 22 and is shown therein at 24. Closed compartment c2 has a plurality of different areas or sections, each at a different height and separated from each other by a rim 25. These sections include a first, larger section defined by an elevated, first bottom 30 identified at a height of H1, and a second lower and smaller section defined by an unheated bottom 32. Bottom 32 is located beneath ascension pipe 23 and is at a level H4 that is below level H1 and is smaller than bottom 30. The section defined by first bottom 30 is heated by a plurality of heaters T1 and T2.

The preparation of beverages is initiated when using a device according to the invention by filling a proper amount of liquid 24 through inlet 22 into closed compartment c2, which is closed by inserting ascension pipe 23 in inlet 22. Ascension pipe 23 has a lower orifice or bottom opening 28 arranged at a level, H3 which is below a level H1 of an elevated bottom 30.

During the brewing of a beverage, the height of liquid 24 will vary by time and within each section. The heights are indicated as follows:

H1: the liquid level of elevated bottom 30;
H2: the height of rim 25;
H3: the liquid level at lower orifice of ascension pipe 23;
H4: the height of the bottom of closed compartment c2 in the ascension pipe area (unheated);
H5: the liquid level in closed compartment c2 before the heat is turned on;
H6: the liquid level in ascension tube before the heat is turned on;
H7: the height of the bottom of a filter f1; and
H8 the maximum liquid level in open container c1.

Ascension pipe 23 is of a unitary construction and has a funnel shape with a lower cylindrical pipe part and an upper enlarged part with an upstanding cylindrical wall that is coaxial with the lower pipe part. The junction between the lower pipe part and the upper enlarged part receives a removable filter f1. The upper enlarged part is an open compartment c1, open to the pressure of the outside environment. Filter f1 receives the aroma carriers, such as coffee. The initial temperature U0 of the temperature u1(t) of liquid 24 contained in closed container c2 is normally the temperature of the tap liquid.

Figure 1B:
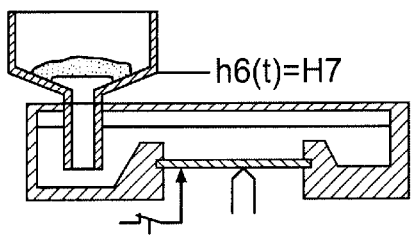
Figure 1C:
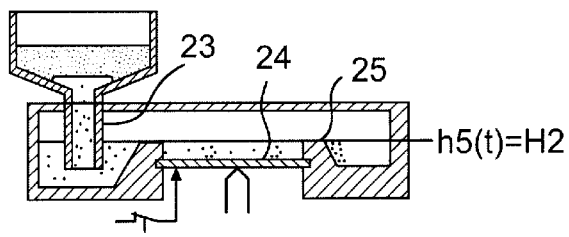
Figure 1D:
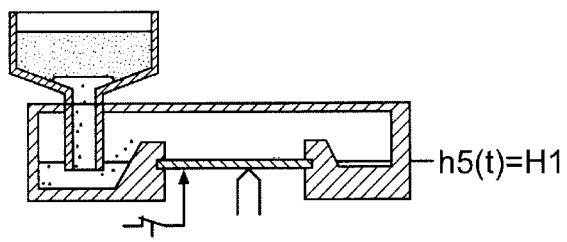
Figure 1E:
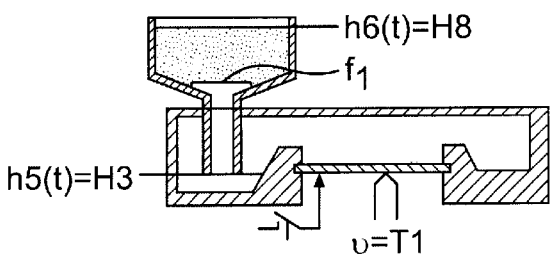
Figure 1F:
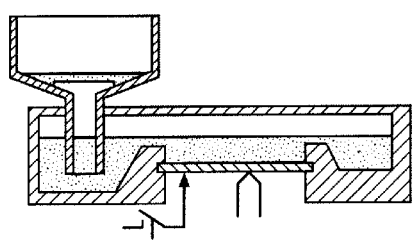
Figure 2A:
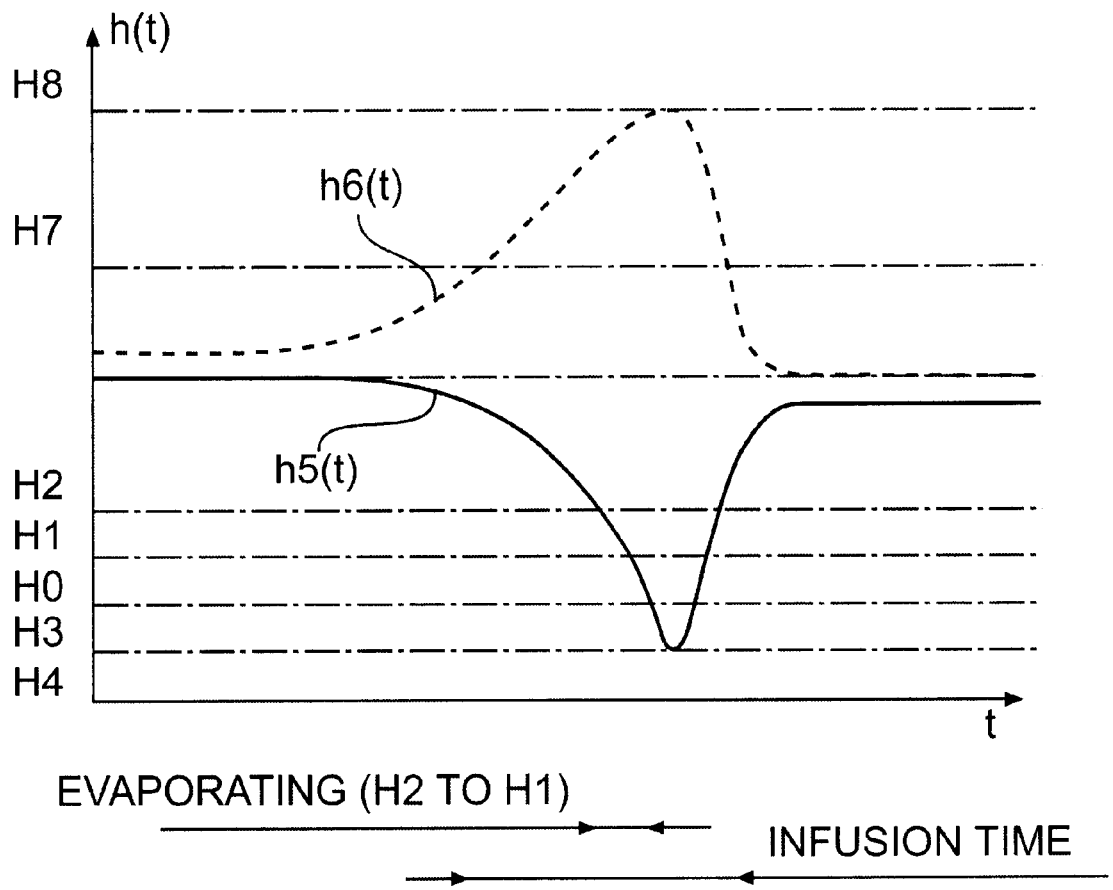
FIGS. 2A to 2D are graphs with respect to time for the different physical conditions, respectively, of liquid level, temperature, pressure, and electrical power of the device according to the present invention, and where the timed stages of FIG. 1 are numbered below FIG. 2D.
Figure 2B:
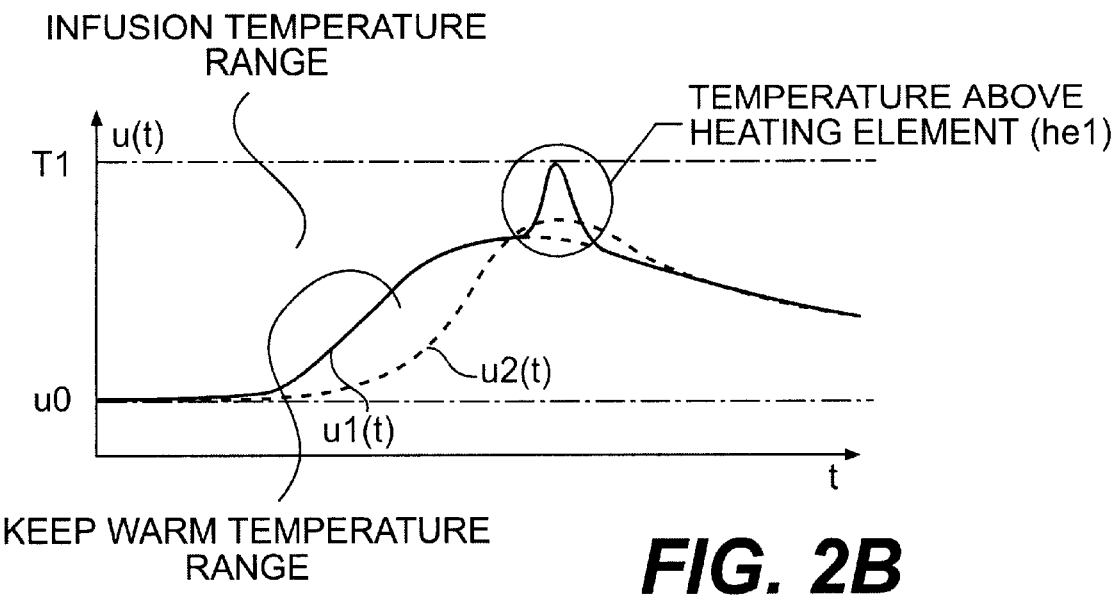
Figure 2C:
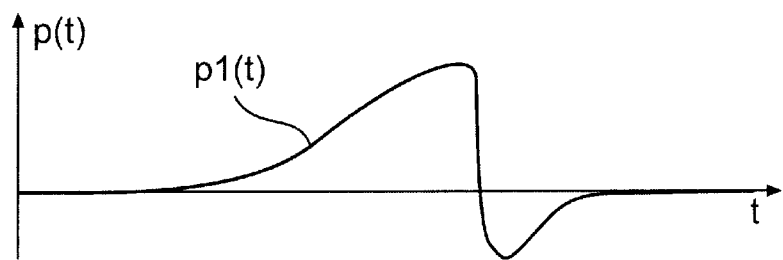
Figure 2D:
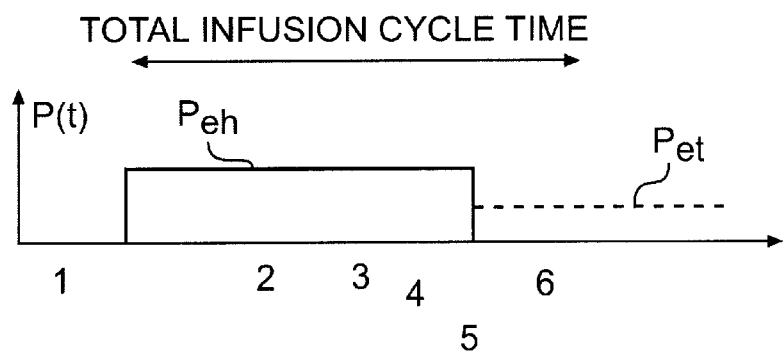

FIGS. 2A to 2D show a coarse time scheme for different physical entities or conditions of the device according to the present invention, where the stages of FIG. 1 are numbered below FIG. 2D with reference to time for all of the FIGS. 2A to 2D FIG. 1. The physical entities are from top to bottom:

the liquid levels of the open compartment c1, indicated by h6(t), and the closed compartment c2, indicated by h5(t), the temperatures of the closed compartment c2, indicated by u1(t), and of the open compartment c1, indicated by u2(t), the top of the curve u1(t) indicating the time where all the liquid has boiled out and the bottom is heated until the safety switch is activated;

the pressure p1(t) in closed compartment c2,;

the electrical power Peh and Pel being switched on and off.

The situation in the beverage preparation device is depicted in FIGS. 1A through 1F, each of which corresponds respectively to the times indicated by the numerals 1 through 6 (shown below FIG. 2D) and applicable to FIGS. 2A through 2D. The initial or starting condition occurs after liquid 24 is deposited in closed container c2, and before switching on a heating means $h_{el}$, as is shown in FIG. 1A and above the numeral 1 in FIGS. 2a through 2D. The level h5(t) of the liquid body in closed compartment c2 is almost equal to, but is slightly below, the level h6(t) of the liquid in ascension pipe 23, because of the capillary effect of ascension pipe 23. The pressure pl(t) in closed compartment c2 is equal to the pressure PO outside closed compartment c2.

The process of preparing the beverage starts when the heating means $h_{el}$ are energized. When heating means $h_{el}$ are turned on, electric power $P_{eh}$ is transformed into heat and the heat is guided to liquid 24, thereby increasing the temperature ul(t) of liquid 24.

Heating means $h_{el}$ in the preferred embodiment are built-in conventional electric heaters, but in an alternative embodiment could include any conventional apparatus that produces heat for food products such as a conventional gas or electric stove. Heating means $h_{el}$ in this embodiment are equipped with at least two temperature sensitive means. A first temperature sensitive means Tl is a safety switch that controls the electric power $P_{eh}$, which is the high power for heating and boiling the liquid. The second temperature sensitive means T2 controls a low level power $P_{el}$ heater which is used to balance any heat loss.

The situation in the beverage preparation device depicted in FIG. 1B, and above the numeral 2 in FIGS. 2A through 2D, is caused by increasing the temperature, and hence upon boiling, by the increasing steam pressure pl(t) of liquid 24. This causes liquid 24 to be forced up into ascension pipe 23 and further up through filter fl into open compartment cl. In open compartment c1 liquid 24 is brought into contact with the aroma carriers, which causes the aroma carriers to soften. The temperature in the open compartment is still close to the ambient or environmental temperature, so infusion has not started at this stage.

The situation in the beverage preparation device depicted in FIG. 1C, and above the numeral 3 in FIGS. 2A through 2D is present when the level h5(t) of the liquid body 24 has reached the level H2 of the upper edge of rim 25, whereby the liquid is being separated into a one part which is sent through ascension pipe 23 and another part which is being left behind rim 25.

As is shown in FIG. 1D, and above the numeral 4 in FIGS. 2A through 2D, this other part of liquid 24 that is left behind rim 25, is a small fraction of the total liquid 24, will very quickly be brought to the infusion temperature ul(t)=u max and boil into steam, and will force the remaining liquid 24 through ascension pipe 23.

The infusion time is defined as the time, during which the small fraction of liquid evaporates from the larger area of the elevated level and enters the ascending pipe as steam continuing to the open compartment, where the latent heat in the steam at the preferred infusion temperature is used for further heating the contents of the open compartment and keeping the preferred infusion temperature stable.

The situation in the beverage preparation device as is shown in FIG. 1E and above the numeral 5 in FIGS. 2A through 2D represents the stage where all of the liquid behind rim 25 has evaporated, and the temperature in open compartment c1 has reached the infusion temperature u max. At this stage the heating means will, in a very short time, reach the temperature where safety switch T1 reacts and breaks the circuit, that transforms the electrical power $P_{eh}$ into heating, and the switching also turns on the electrical power $P_{el}$ for keeping the beverage at the desired temperature for drinking.

The infusion has now been finished and the beverage now at its full taste will now be transported from open compartment c1 to closed compartment c2 in the shortest possible time, as is shown in FIG. 1F and above the numeral 6 in FIGS. 2A through 2D. This is desirable because, when the aromatic carriers have delivered their aroma, the beverage will not gain further taste components if left in the open compartment.

The transport back into closed compartment c2 is effected by cooling closed compartment c2, thereby decreasing the pressure in closed compartment c2. When decreasing the pressure a pressure gradient will be present over the filter, which will cause the beverage in open compartment cl to be transported back through the ascension pipe 23 to closed compartment c2.

When all of the beverage has left open compartment c1, as shown in FIG. 1F, open compartment c1 and ascension pipe 23 can be removed, and the beverage is ready for drinking.

In another embodiment it is possible to switch on the electrical power Pel at a later time than the switching of the electrical power $P_{eh}$ at the end of the infusion time. Thereupon closed compartment c2 will cool faster and the beverage will be transported back to closed compartment c2 at an earlier stage. This removes the beverage from the aroma carriers faster than normal.

Figure 3:
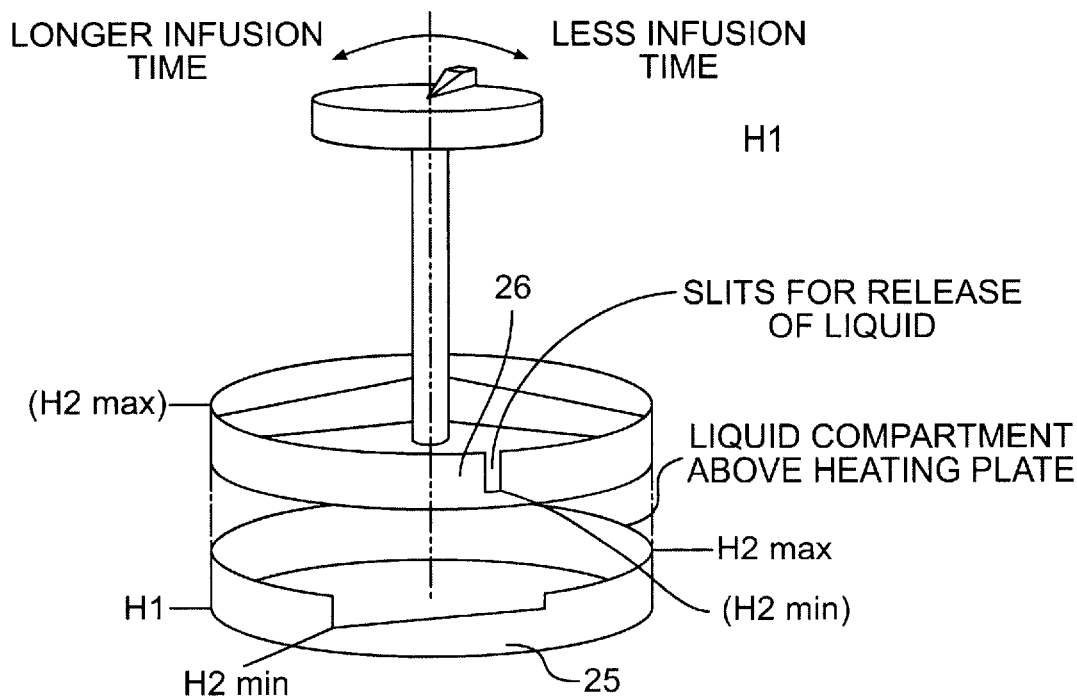
FIG. 3 is a perspective view of a schematic representation of a cylindrical lining on the inside of the rim.
Figure 4:
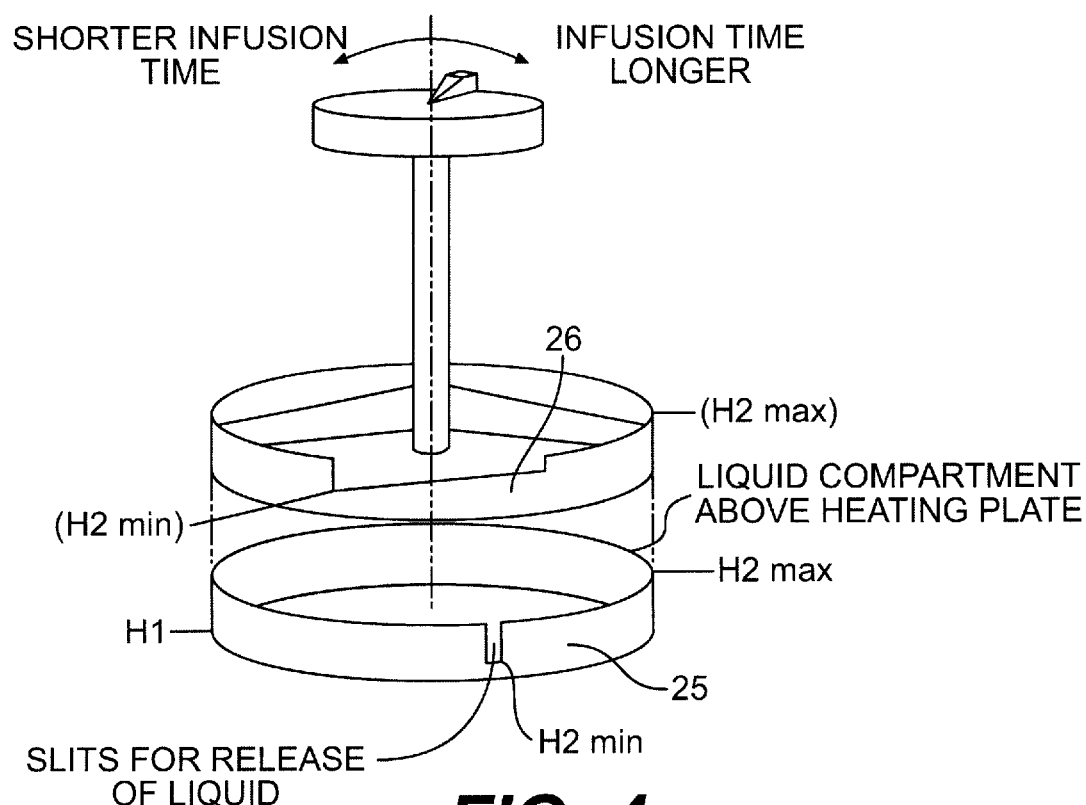
FIG. 4 is a perspective view of another embodiment of the cylindrical lining.

In still another embodiment it is possible to achieve the same variability of infusion time by mechanically varying the effective height of the rim 25. In a preferred embodiment of such arrangement, shown in FIGS. 3 and 4, this is achieved by having a cylindrical lining 26 on the inside of the rim 25 being pivotally secured to the rim 25, which is of varying height along the circumference, said lining 26 itself having a varying height. The varying height of the lining 26 can be made in different ways, and in the preferred embodiment it is made by a slot 27 in the lining as shown in FIG. 3. Of course, the opposite could be used as well as shown in FIG. 4. It should be observed, that the variation here is reversed, so that the infusion time will increase, when the knob is turned clockwise. Also the rim and the lining 26 could be made with continuously varying height, where the variations are mirror symmetrical, respectively. Such embodiment would be represented by the rim 25 of FIG. 3 in combination with the mirrored representation of the lining 26 of FIG. 4.

With said embodiment the variation of the infusion time can be achieved by simply turning a common knob, which in a known manner is connected to the lining 26.

Figure 5:
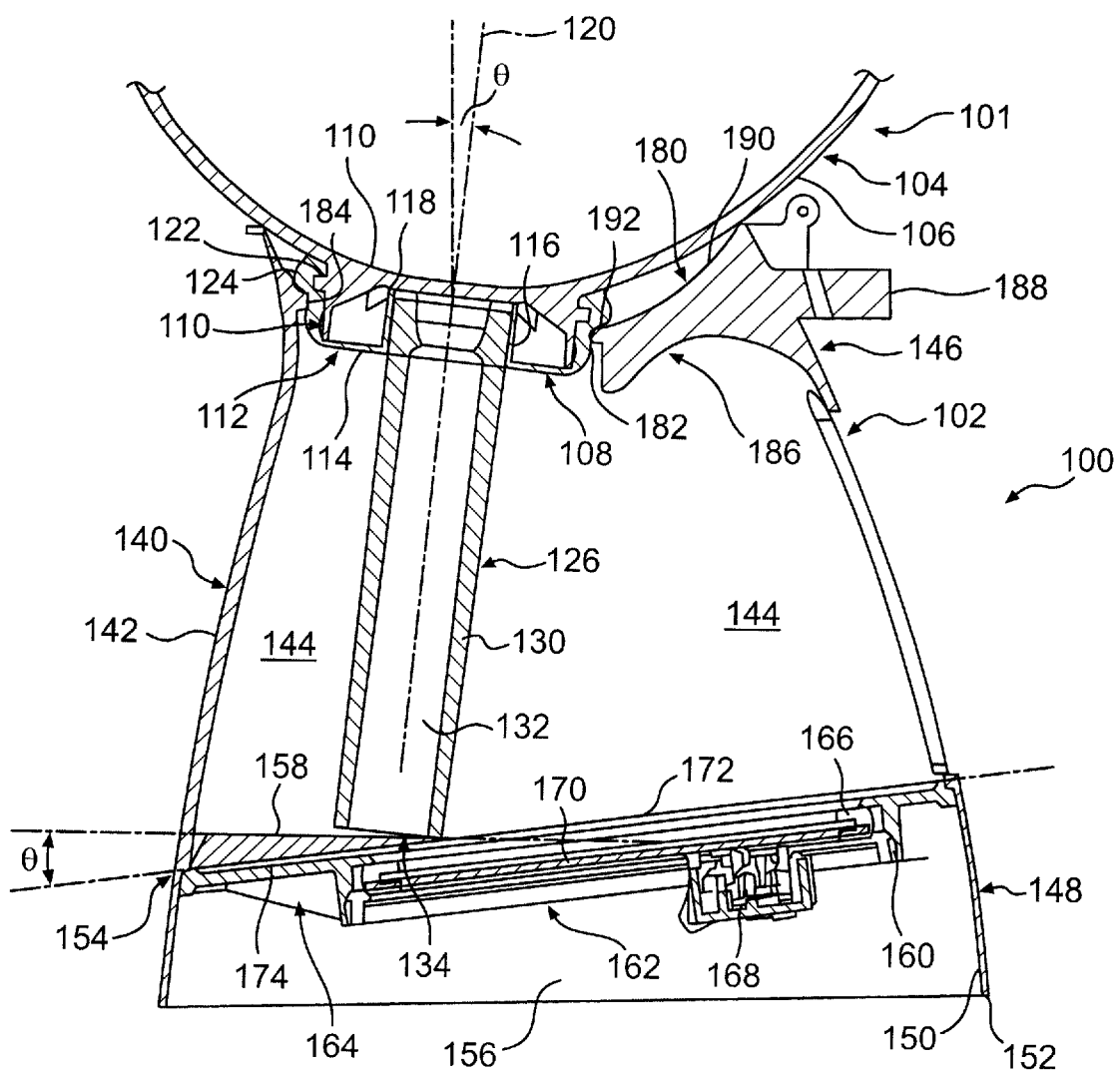
FIG. 5 is a partial side elevational view in cross-section of another embodiment of the beverage preparation device according to the present invention.

Another embodiment of the present invention is depicted in FIG. 5 in which rim 25 has been removed and replaced by other means for providing a division of liquid 24 as liquid 24 is being boiled off. Other such means include tilting the bottom of closed compartment c2, the eccentric location of ascension pipe 23, and the tilting of ascension pipe 23 off a vertical axis.

FIG. 5 comprises a hot beverage maker 100 having an upper open compartment 101 and a closed compartment 102. Open compartment 101, is open to the external environment, is removably attached to closed compartment 102 as described hereinbelow, and is only partly shown in FIG. 5. Open compartment includes a container 104 having an upstanding rounded wall 106 and an annular, depending collar 108 eccentrically located at a bottom portion of and integral with wall 106. Collar 108 includes a depending base portion 110 integral with wall 106 at an upper end thereof and a flexible section 112 comprised of a horizontal spacer portion 114 and an upstanding, hollow, tubular portion 116. Collar tubular portion 116 defines an inner orifice or opening 118 therethrough, the central axis of which, denoted 120, is angled from the vertical by an angle θ of between about 2 degrees to about 10 degrees, and preferably from about 4 degrees to about 6 degrees. Collar 108 also has an annular rim 122 on an external side thereof. A relatively pliable gasket 124 is mounted over rim 122 and serves as part of a means for securing or locking container 104 on closed compartment 102.

Removably mounted through opening 118 in collar flexible section 112 is an elongated, hollow ascension pipe 126 which is coaxial with collar central axis 108. Thus, ascension pipe 126 also forms an angle θ with the vertical and because collar 108 is eccentrically arranged in container 104, ascension pipe 126 is eccentrically positioned in beverage maker 100. Ascension pipe 126 is comprised of an upper mounting end section 128 that has about the same outer diameter as does the inner diameter of opening 118 in collar base portion 110. Ascension pipe 126 is also comprised of a lower tubular section 130 that has an inner bore 132, a predetermined length L, and a lower opening 134.

Closed compartment 102 is comprised of an enclosed container 140 having an upstanding, somewhat cylindrical wall 142 which defines an inner hollow chamber 144, a top section 146 and a bottom section 148. Bottom section 148 includes an annular skirt 150 having a bottom edge 152, and a tilted bottom 154 mounted within and at the top of skirt 150, and thus spaced from bottom edge 152. Bottom edge 152 sits on a support surface (not shown). Thus skirt 150 defines an inner bottom space 156 in which various control units described hereinbelow are mounted. An angled wedge 158 is mounted in the location of ascension pipe 126 on bottom 154 with its thicker end being in contact with container wall 142. Wedge 158 has an incline such that when so mounted, its upper surface is parallel to bottom edge 152. The lower end of ascension pipe 126, when installed as shown in FIG. 5, makes contact at or near the junction of bottom 154 and wedge 158.

When beverage maker 100 is positioned on a horizontal support surface, bottom edge 152 is horizontal and bottom 154 makes an angle φ therewith. Angle φ can be from about 3 degrees to about 15 degrees, but preferably is from about 5 degrees to about 9 degrees.

A utility housing 160 is eccentrically mounted inside bottom space 156 to a portion of the underside of bottom 154 and divides bottom space 156 into a larger portion 162 occupied by utility housing 160, and a smaller portion 164 above which wedge 158 and ascension pipe 126 are located. A dual-heat electrical heater 166 is mounted inside utility housing 160 and is comprised of a control and temperature sensor unit 168 and a heater coil 170. Heater coil 170 covers and thus heat only larger portion 162 of bottom 154, thereby separating bottom 154 into a larger heated section 172 and a smaller unheated section 174. Because bottom 154 tilts upwardly away from wedge 158 and ascension pipe 126, unheated section 174 is located vertically lower than heated section 172. Consequently, as discussed above with respect to FIG. 1E, the residual liquid produced during the brewing process collects in unheated section 174.

Top section 146 of container 140 is comprised of a closed portion 180 which has an eccentrically located orifice 182, defined by a rim 184, into which collar 108 and accession pipe 126 are sealingly mounted. Rim 184 engages and retains annular rim 122 in place. Pivotally mounted on closed portion 180 is a engagement mechanism 186 that is comprised of a handle 188 and a body 190 with an engaging lip 192. Rim 184 and engagement mechanism 186 are also part of a means for securing or locking container 104 on closed compartment 102.

The operation of beverage maker 100 depicted in FIG. 5 is substantially similar to the operation of the device depicted FIG. 1A.

An essential feature in the embodiment of the invention as depicted in FIG. 5 is that after the boiling process has been completed, the liquid returning from open compartment 101 does not strike a surface having a temperature much different from the liquid. That is, the brewed liquid displaces the residual water, which will cool off the still hot surface of the heater plate, and the brewed liquid will not get burned.

Still more and various modifications can be made to the device and the method of the present invention. For instance, the electronic switching can be controlled by a micro processor which can very precisely control the temperature decrease necessary for transporting the beverage back to the closed compartment c2. Also, a mechanical variation of the infusion time can be provided with different means, e.g. by elevating or diminishing the level of the upper edge of the rim 25 in relation to the elevated level H1 of the bottom 30, or vice versa.

While the invention has been particularly shown and described with reference to preferred embodiments thereof, it will be understood by those skilled in the art that various changes in form and detail may be made therein without departing from the spirit and scope of the invention.

I claim:

1. A device for preparing beverages of the type which includes a closed compartment having a base with a base bottom portion that can be supported by a supporting surface and that defines a reference plane, an open compartment received by said closed compartment, an ascension pipe connecting the compartments and having a lower orifice, and a location in which a filtering device can be inserted between the ascension pipe and the open compartment, whereby said closed compartment includes a bottom, said bottom comprises:
a heatable large area having a bottom section with at least a part thereof located at a first level above the base bottom, and
an unheated small area smaller than said large area, said small area having a bottom section located at a second level the height of which is closer to said base bottom than said large area bottom section, said small area being proximate to said lower orifice of said ascension pipe, and said ascension pipe lower orifice defines a third level, said third level being between said first level and said second level;
said device further comprising a heater located so as to cover and thereby heat only said large area, but not to heat said small area; and
wherein said ascension pipe is arranged eccentrically in relation to said closed compartment bottom.

2. A device for preparing beverages as claimed in claim 1, wherein said open compartment is removably received by said closed compartment.

3. A device for preparing beverages as claimed in claim 1, wherein said ascension pipe has a centerline that is at an angle with a vertical.

4. A device for preparing beverages as claimed in claim 3, wherein said bottom section of said large area is at an angle with the reference plane of said base bottom portion.

5. A device for preparing beverages as claimed in claim 1, wherein said bottom section of said large area is at an angle with the reference plane of said base bottom portion.

6. A device for preparing beverages as claimed in claim 5, wherein said bottom section of said small area is at least substantially parallel to the reference plane.

7. A device for preparing beverages as claimed in claim 6, wherein said bottom section of said small area is defined by a wedge having a wedge bottom surface that is supported by said closed compartment bottom and a wedge top surface that is at least substantially parallel to the reference plane.

8. A device for preparing beverages comprising:

a closed compartment;

an open compartment;

an ascension pipe connecting the compartments, said ascension pipe having a lower orifice; and a location between said ascension pipe and said open compartment for receiving a filtering device, whereby said closed compartment includes a bottom, said bottom comprises:

a heatable large area having a bottom portion which is located at least partially at a first level; and an unheated small area smaller than said large area and having a bottom portion which defines a second level, said small area being around the lower orifice of the ascension pipe, said second level being at least below said first level of said large area, and said ascension pipe lower orifice defines a third level, said third level being below said first level, said closed compartment further includes separating means for separating said large area from said small area; and an electrical heater that heats said large area.

9. A device for preparing beverages as claimed in claim 8, wherein said separating means is a rim.

10. A device for preparing beverages as claimed in claim 9, wherein said separating means is an inclined bottom of said large area.

11. A device for preparing beverages as claimed in claim 10, wherein said ascension pipe is located eccentrically.

12. A device for preparing beverages as claimed in claim 11, wherein said ascension pipe is tilted with respect to a vertical axis.

13. A device for preparing beverages as claimed in claim 8 wherein said ascension pipe is located eccentrically and is tilted with respect to a vertical axis.

14. A device for preparing beverages comprising:

a closed compartment;

an open compartment;

an ascension pipe connecting said open and said closed compartments, said ascension pipe having a lower orifice and being eccentrically mountable to said open compartment and mountable at an angle to a vertical line;

a location between said ascension pipe and said open compartment for receiving a filtering device;

whereby said closed compartment includes a bottom having a large, heatable first bottom portion that is inclined with respect to the horizontal, and a small, unheated second bottom portion that is smaller than said first bottom portion, is at least substantially horizontal, and is located proximate to said ascension pipe lower orifice;

a second level of said second bottom portion being at least below a first level of said large area, and said ascension pipe lower orifice defines a third level, said third level being between said first and second levels; and an electrical heater that heats said large area.

* * * * *